US010937001B1

(12) United States Patent
Isgar

(10) Patent No.: US 10,937,001 B1
(45) Date of Patent: *Mar. 2, 2021

(54) SMARTPHONE LOCK BOX SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,216

(22) Filed: Mar. 9, 2020

Related U.S. Application Data

(63) Continuation-in-part of application No. 16/377,410, filed on Apr. 8, 2019, now Pat. No. 10,630,832, which is a continuation-in-part of application No. 16/005,554, filed on Jun. 11, 2018, now Pat. No. 10,277,730.

(60) Provisional application No. 62/587,931, filed on Nov. 17, 2017.

(51) Int. Cl.
*G06Q 10/10* (2012.01)
*A45C 11/00* (2006.01)
*G07C 1/32* (2006.01)
*H04W 4/80* (2018.01)

(52) U.S. Cl.
CPC .......... *G06Q 10/1091* (2013.01); *A45C 11/00* (2013.01); *G07C 1/32* (2013.01); *H04W 4/80* (2018.02); *A45C 2011/002* (2013.01)

(58) Field of Classification Search
CPC . H04M 1/72563; G07C 11/00; G07C 9/00007
USPC ........................ 455/405; 340/5.73; 312/223.4
See application file for complete search history.

(56) References Cited

U.S. PATENT DOCUMENTS

| | | | |
|---|---|---|---|
| 1,002,779 | A | 9/1911 | Maguire |
| 6,047,573 | A | 4/2000 | Martinez |
| 6,951,468 | B1 | 10/2005 | Greco |
| 6,989,732 | B2 | 1/2006 | Fisher |
| 7,009,489 | B2 | 3/2006 | Fisher |
| 7,734,068 | B2 | 6/2010 | Fisher |
| 8,451,088 | B2 | 5/2013 | Fisher |
| 9,053,629 | B2 | 6/2015 | Fisher |
| 9,300,347 | B1 | 3/2016 | Coverstone |
| 9,430,892 | B2 | 8/2016 | Amdahl |
| 9,780,579 | B2 | 10/2017 | Frankenberger |
| 9,990,791 | B2 | 6/2018 | Firth |

(Continued)

OTHER PUBLICATIONS

Misener, Dan. Distracted by your smartphone? Lock it up, say DistractaGone developers. CBC News. Oct. 4, 2016. 6 pages. online article: https://www.cbc.ca/news/technology/distractagone-smartphone-lockbox-1.3790485.

*Primary Examiner* — Charles T Shedrick
(74) *Attorney, Agent, or Firm* — Schmeiser, Olsen & Watts LLP

(57) ABSTRACT

Described is a smartphone lock box system that is used to track and record when and how long a mobile computing device is locked or secured in a container, such as a box, a sleeve or the like, without access by the owner of the mobile computing device. The smartphone lock box system is used to help the owner of a mobile computing device disconnect from the mobile computing device to devote time and attention to other tasks. The smartphone lock box system includes a container that holds at least one mobile computing devices such as a smartphone or tablet. The mobile computing device operating a lock box application senses it is within the container and records and reports the amount of time the mobile computing device is in the container and tracks the frequency that the user checks or removes the phone from the container.

9 Claims, 16 Drawing Sheets

(56) References Cited

U.S. PATENT DOCUMENTS

| | | |
|---|---|---|
| 10,027,795 B1 | 7/2018 | Maguire et al. |
| 10,027,798 B2 | 7/2018 | El-Gawady et al. |
| 2006/0196792 A1 | 9/2006 | Barth et al. |
| 2006/0272969 A1 | 12/2006 | Hartstein |
| 2009/0026899 A1 | 1/2009 | Jerro |
| 2011/0014863 A1 | 1/2011 | Foster |
| 2011/0156899 A1 | 6/2011 | Lauer et al. |
| 2012/0255977 A1 | 10/2012 | Youssefi-Shams et al. |
| 2012/0280014 A1 | 11/2012 | Lopez-Apodaca |
| 2013/0143489 A1 | 6/2013 | Morris |
| 2013/0281169 A1 | 10/2013 | Coverstone |
| 2013/0322013 A1 | 12/2013 | Steele |
| 2014/0128131 A1 | 5/2014 | Sin |
| 2014/0268517 A1 | 9/2014 | Moon |
| 2015/0155917 A1 | 6/2015 | Won |
| 2015/0229754 A1 | 8/2015 | Won |
| 2015/0371187 A1 | 12/2015 | Irwin |
| 2016/0050303 A1 | 2/2016 | Larriviere |
| 2016/0182115 A1 | 6/2016 | Chen |
| 2016/0232387 A1 | 8/2016 | Myers et al. |
| 2016/0270025 A1 | 9/2016 | Osann |
| 2016/0321847 A1 | 11/2016 | Briskey |
| 2017/0309092 A1 | 10/2017 | Rosenbaum |
| 2017/0323503 A1 | 11/2017 | Garcia |
| 2017/0359460 A1 | 12/2017 | Jackson et al. |

SMARTPHONE LOCK BOX SYSTEM

CROSS REFERENCE TO RELATED APPLICATION[S]

This application is a continuation-in-part of the earlier U.S. Utility patent application entitled "SMARTPHONE LOCK BOX SYSTEM," Ser. No. 16/377,410, filed Apr. 8, 2019, which is a continuation-in-part of U.S. Utility patent application entitled "SMARTPHONE LOCK BOX SYSTEM," Ser. No. 16/005,554, filed Jun. 11, 2018, which claims priority to U.S. Provisional Patent Application entitled "SMARTPHONE LOCK BOX SYSTEM," Ser. No. 62/587,931, filed Nov. 17, 2017, the disclosures of which are hereby incorporated entirely herein by reference.

BACKGROUND OF THE INVENTION

Technical Field

This invention relates to smartphone accessories, and specifically to a container for retaining a smartphone or other mobile computing device within the container, and tracking and logging the amount of time the smartphone is retained in the container, preventing access to the smartphone, eliminating distractions while working, studying or other activities, and tracking and logging the frequency that the user checks or removes the smartphone from the container.

State of the Art

Individuals spend increasing amounts of time using their smartphones. This includes significant usage in the workplace, during study hours, and the like. In fact, there is a growing concern about addictiveness of smartphones, particularly with teenagers and college students. This increased use of smartphones is bleeding over into increased use in the workplace, causing inefficiencies and posing concern for companies. With regard to students, parents often have trouble getting their student-aged children to put their smartphones down for homework, housework, or other activities. Parents often use a student's smartphone as an incentive to get the student to perform a task. Additionally, certain uses of smartphones during operation of vehicles of any type is a safety concern by distracting users/drivers during operation that can lead to accidents and the like.

Accordingly, what is needed is a container, for placing a smartphone in, that tracks and reports the amount of time that the smartphone is secured in the container, the time of day when the smartphone is secured in the container, the frequency with which it is removed, and reports the phone owner's accessing the device. The container does not have to physically lock but merely provide a physical barrier from being a distraction to the owner.

DISCLOSURE OF THE INVENTION

The disclosed invention relates to smartphone accessories, and specifically to a container for securing a smartphone, where the container tracks and reports the amount of time the smartphone is secured in the container and the frequency that the user checks or removes the phone from the container.

An embodiment includes a smartphone lock box system comprising: a container with a lid, wherein the container holds a mobile computing device and limits physical tactile engagement to the mobile computing device and the lid is clear to provide visual access to the mobile computing device; and a close proximity communication system comprising a sensing element integrated into the container, wherein the sensing element is sensed by the mobile computing device running a lock box application to determine that the mobile computing device is within the container, wherein a display of the mobile computing device is visible through the clear lid and displays an indication of at least one of: an amount of time the mobile computing device has been within the container; an amount of time elapsed of a predetermined established time the mobile computing device should be in the container; or an accumulation of amounts of time the mobile computing device has been within the container during a designated period of time even if the mobile computing device was removed and replaced within the container during the designated period of time.

Another embodiment includes a smartphone lock box system comprising: a container with a clear portion, wherein the container holds a mobile computing device and limits physical tactile engagement to the mobile computing device and the clear portion provides visual access to the mobile computing device; and a close proximity communication system comprising a sensing element integrated into the container, wherein the sensing element is sensed by the mobile computing device running a lock box application to determine that the mobile computing device is within the container, wherein a display of the mobile computing device is visible through the clear portion and displays an indication of at least one of: an amount of time the mobile computing device has been within the container; an amount of time elapsed of a predetermined established time the mobile computing device should be in the container; or an accumulation of amounts of time the mobile computing device has been within the container during a designated period of time even if the mobile computing device was removed and replaced within the container during the designated period of time.

Another embodiment includes a smartphone lock box system comprising: a mobile computing device operating a lock box application; a container, wherein the container holds the mobile computing device and limits physical tactile engagement to the mobile computing device; and a sensing device of the mobile computing device, wherein the sensing device determines that the mobile computing device is within the container during operation of the lock box application.

Another embodiment includes a smartphone lock box system for clocking in for work comprising: a single mobile computing device of an employee, the single mobile computing device operating a lock box application; a container with a clear front portion, wherein the container holds only the single mobile computing device and limits physical tactile engagement with the mobile computing device; and a close proximity communication system comprising a passive close proximity sensing element integrated into or coupled to the container and a sensing device of the mobile computing device, wherein the sensing device determines that the mobile computing device is within the container during operation of the lock box application in response to the mobile computing device being placed in close proximity to the passive close proximity sensing element only when within the container, wherein a display screen of the mobile computing device is visible through the clear front portion and displays an indication of clocking in and an accumulation of amounts of time the mobile computing device has been within the container during a designated period of time less the time the mobile computing device is removed until replaced within the container and senses the passive sensing element again during the designated period of time, and wherein the lock box is located at a business office or at a home of the employee.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1A:
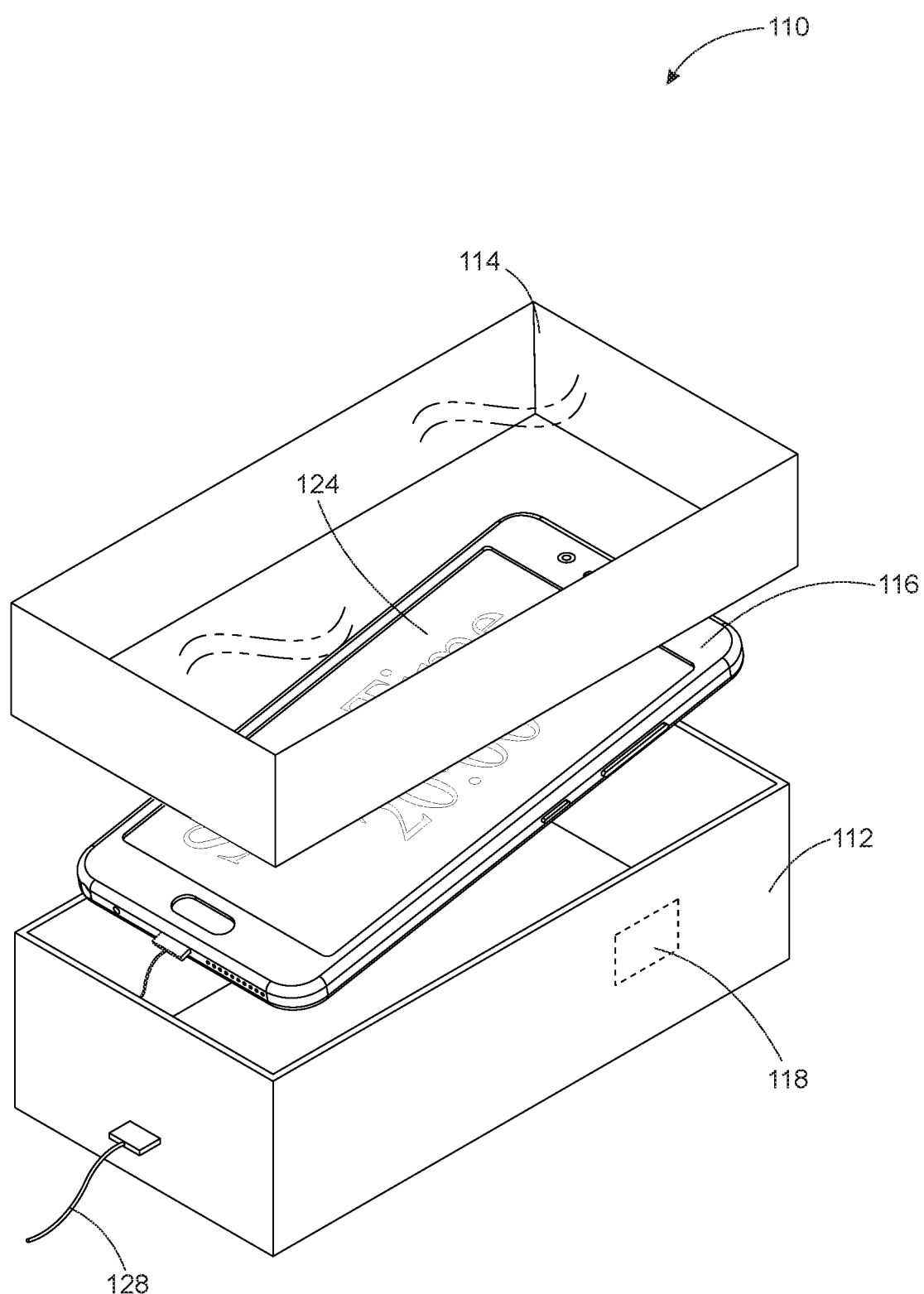
FIG. 1A is a perspective view of a smartphone lock box system according to an embodiment.
Figure 1B:
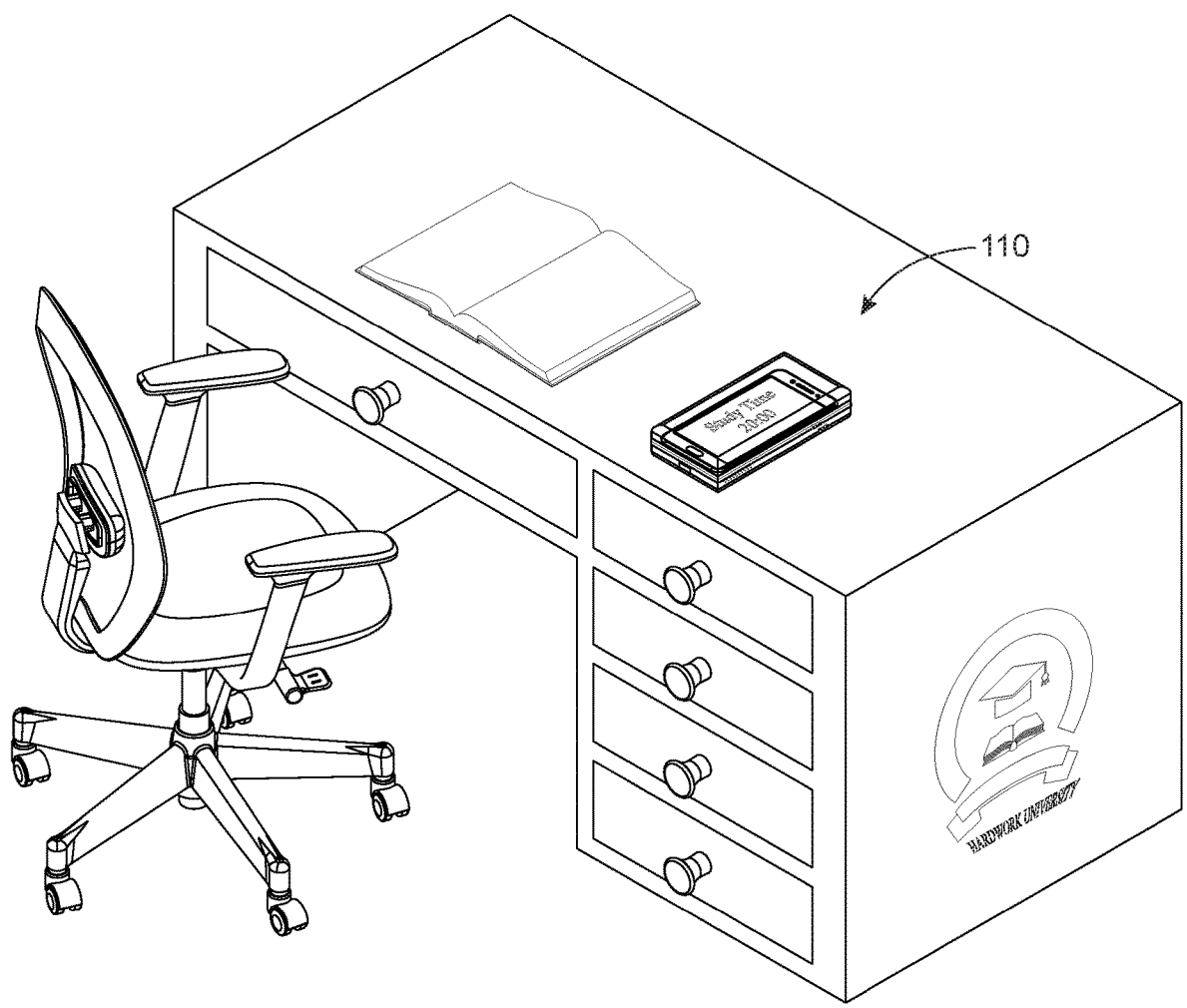
FIG. 1B is a perspective view of a smartphone lock box system on a student desk according to an embodiment.

As discussed above, embodiments of the present invention relate to mobile computing device accessories, and specifically to a container for retaining a mobile computing device within the container and tracking the amount of time the mobile computing device is retained within the container.

It is increasingly recognized that smart phones have become a significant distraction to teens, students and workers. Many millennials check their phones over 100 times a day and spend hours engaged with the device each day. Numerous studies cite that smartphone device addiction is a significant parenting and learning issue. Also, the workplace has recognized that constant checking of smart phones leads to disengagement and distraction from work, affecting productivity for certain companies. Recently, a leading phone maker has recognized that the devices are being overutilized and has encouraged solutions to monitor and limit usage.

Disclosed is a smartphone lock box system that can be used to track and record time that a smartphone is locked or secured in a box with limited physical tactile engagement. The smartphone lock box system includes a box or container for locking a mobile computing device such as a smartphone or tablet into, so that the mobile computing device cannot be physically utilized while in the box. The smartphone lock box system can be used by employers and employees to have the employees check in their smartphones to limit distractions while working. The smartphone lock box system, when used in a workplace environment, records and reports the amount of time the mobile computing device is locked or secured in a retaining unit and the frequency and duration of any times an employee removes the phone from the retaining unit. Each employer and work group can establish acceptable limits of access and set the system to only alert or report when overuse is recognized. Also, the system can provide a report of cumulative smartphone-free time worked, start time, end time and frequency of distractions for a certain worker at their station.

The smartphone lock box system can be used by parents and children to get the children to leave their smartphones alone while doing homework or housework, or to just spend time without using the smartphone. The smartphone lock box system records and reports the amount of time and time of day the mobile computing device is locked or secured in the box. Parents can use the smartphone lock box system to incentivize a child to not use their mobile computing device for certain amounts of time or at certain times of the day. The smartphone lock box system helps young adults get away from their smartphones, and helps parents monitor and track the mobile computing device usage of their children. Parents use the smartphone lock box system to encourage and reward their children for paying attention to schoolwork and become less reliant on technology.

FIGS. 1-4 depict embodiments of a smartphone lock box system 110. Smartphone lock box system 110 is used to lock a smartphone or other mobile computing device into a box so that the smartphone cannot be accessed for a certain period of time. The smartphone lock box system can be used by parents who want to encourage and reward their children for paying attention to schoolwork, housework, family, or to just become less reliant on their smartphones.

Smartphone lock box system 110 includes a box or container 112 with a lid 114. Box or container 112 is configured to contain a mobile computing device 116. Lid 114 is coupled to box or container 112 so that mobile computing device 116 cannot be accessed while it is retained in box or container 112. Box or container 112 has a sensing element 118 integrated into box or container 112. Sensing element 118 is sensed by the mobile computing device 116 when a lock box software application 126 is running on mobile computing device 116. Lock box application 126 runs on mobile computing device 116 to sense the sensing element 118 of the box or container 112 to determine that the mobile computing device 116 is within a close proximity of the sensing element 118 and therefore within the box or container 112. The lock box software application 126 also operates to control the smartphone lock box system 110. The lid 114 may be clear or the lid 114 and the box or container 112 may both be clear, allowing the mobile computing device 116 to be viewed from outside of the box or container 112 while it is within the box or container 112 and the lid 114 is in a closed position.

Mobile computing device 116 can be any type of mobile device with computing capability, such as a smartphone, a cellular telephone, a mobile computer, a computing tablet or pad, or any other device that can be mobile and has computing capabilities. Mobile computing device 116 is a smartphone in the embodiment shown in the figures, but this is not meant to be limiting. Additionally, the box or container 112 may be any type of retaining unit, such as a basket, a container, a multi-slot shelving system, a locker or set of lockers, and the like.

Mobile computing device 116 has a lock box application 126 loaded onto mobile computing device 116 in this embodiment. Lock box application 126 controls smartphone lock box system 110 and records and reports when mobile computing device 116 is secured in box or container 112, and for how long. Lock box application 126 is a software application in this embodiment, but this is not meant to be limiting.

According to particular embodiments, communication link 120 between the sensing element 118 and the mobile computing device 116 operating the software application may be any type of close-proximity communication link. For example, and without limitation, the communication link 120 may be a Near Field Communication ("NFC") link. NFC is related to radio-frequency identification (RFID) with the exception that NFC is designed for use by devices within close proximity to each other. Devices using NFC may be active or passive. A passive device has information that is readable by other devices; however, the passive device cannot read information of another device. Active devices can read and send information. An example of an active device is a smartphone. In active NFC, each device is active and, when a device sends data, it generates an RF field, and when waiting, the device does not generate an RF field. In other words, the RF field is alternately generated by each device. In passive NFC, the RF field is only generated by one device. NFC devices may also provide secure communication by using a secure channel and encryption when sending sensitive information.

In general, there are three current signaling technologies for NFC devices to talk to each other. These signaling technologies are referred to as NFC-A, NFC-B and NFC-F. When devices first communicate, they communicate the signal type and then transmit data in compliance with the specified protocol.

NFC-A corresponds with RFID Type A communication. In Type A communication, Miller encoding is used with amplitude modulation at 100 percent. A signal sent between devices must change from 0 to 100 percent to register the difference between sending a "1" and a "0." Data is transmitted at 106 Kbps when using Type A communication.

Similar to NFC-A, NFC-B corresponds with RFID Type B communication. Type B uses Manchester encoding. Amplitude modulation is at 10 percent, wherein a 10-percent change from 90%, for low, to 100%, for high, is used. A change from low to high represents a "0" while high to low represents a "1."

NFC-F refers to a faster form of RFID transmission known as FeliCa. FeliCa is a technology similar to NFC but faster and currently more popular. It is used for a variety of services such as subway tickets, credit card payments, and identification at office buildings and other locations with limited access.

The system 10 may utilize various types of NFC communication, including active or passive NFC, as well as using various types of signals. The NFC provides close-proximity communication between the mobile computing device 116 and the sensing element 118 of the lock box or container 112 only when the mobile computing device 116 is placed within the lock box or container 112 while operating the lock box software application 126.

Box or container 112 is designed to hold mobile computing device 116. Box or container 112 has a lid 114 that is moveable between an open and a closed position, wherein, in the open position, the mobile computing device 116 may be placed within or removed from the box or container 112. When in the closed position, and the mobile computing device is within box or container 112, it retains the mobile computing device 116 within the box or container 112 and prevents direct physical tactile engagement to the mobile computing device 112 while still providing visual access to the mobile computing device 116. Box or container 112 can be made in different sizes for different mobile computing device sizes. In some embodiments, box or container 112 can be made large enough to hold multiple mobile computing devices 116. Smartphone lock box system 110 may be used by churches or schools to contain a number of mobile computing devices 116. In some embodiments, box or container 112 will be able to contain and communicate with a plurality of mobile computing devices 116.

Sensing element 118 is integrated into box or container 112 to provide box or container 112 with specific communication ability. Sensing element 118 as stated previously may be sensed by the mobile computing device 116 operating the lock box software app 126 using communication link 120. This communicates to the mobile computing device 116 that the mobile computing device is within the box or container 112 and the system 110 can identify that the mobile computing device 116 is within the box or container 112 for data gathering and reporting purposes.

Again, it is contemplated that any type of close-proximity sensing element and communication link may be utilized between sensing element 118 and the mobile computing device 116. For example, and without limitation, it may be NFC communication, Bluetooth communication, may be a scannable code by a camera of the mobile computing device 116 when it is placed within the box or container 112 or any type of close-proximity communication.

In some embodiments, mobile computing device 116 can be charged while in box or container 112 using a power connection 138 between box or container 112 and mobile computing device 116, or from an external power supply into the box or container 112 with connection 128. The box or container 112 may be a form of a mobile charging device.

Figure 1C:
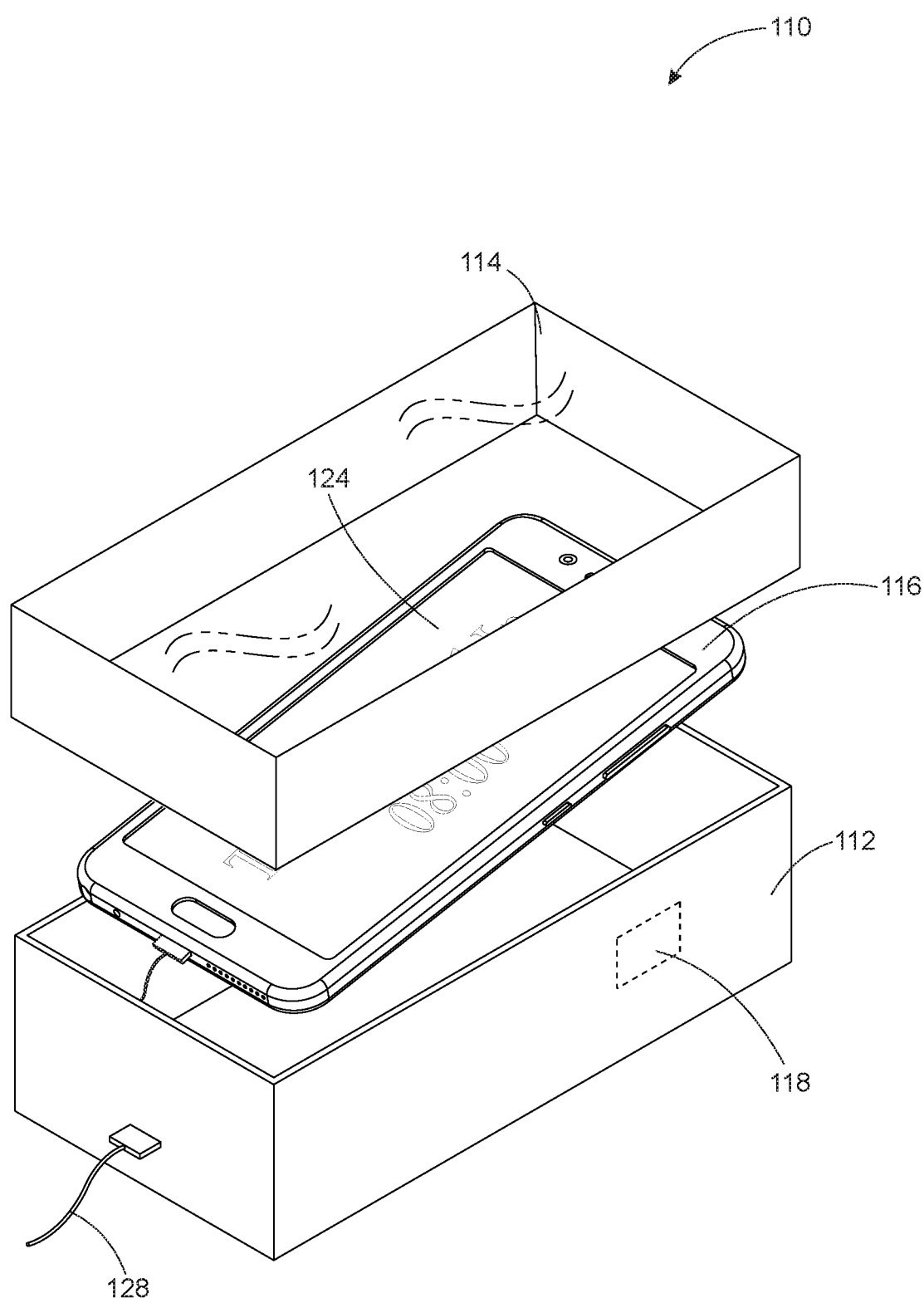
FIG. 1C is a perspective view of a smartphone lock box system for use in an employment environment according to an embodiment.
Figure 1D:
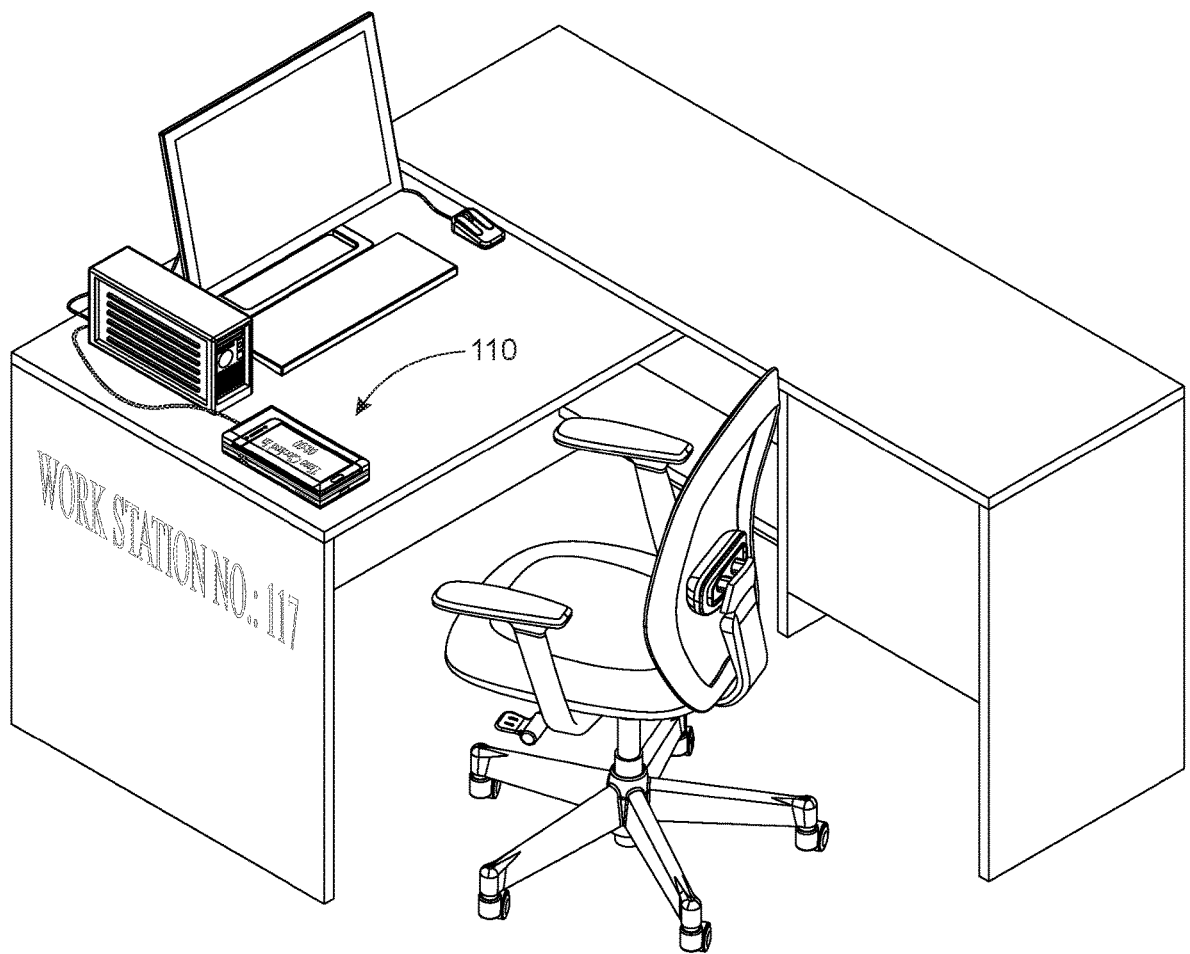
FIG. 1D is a perspective view of a smartphone lock box system on a workplace desk according to an embodiment.
Figure 2:
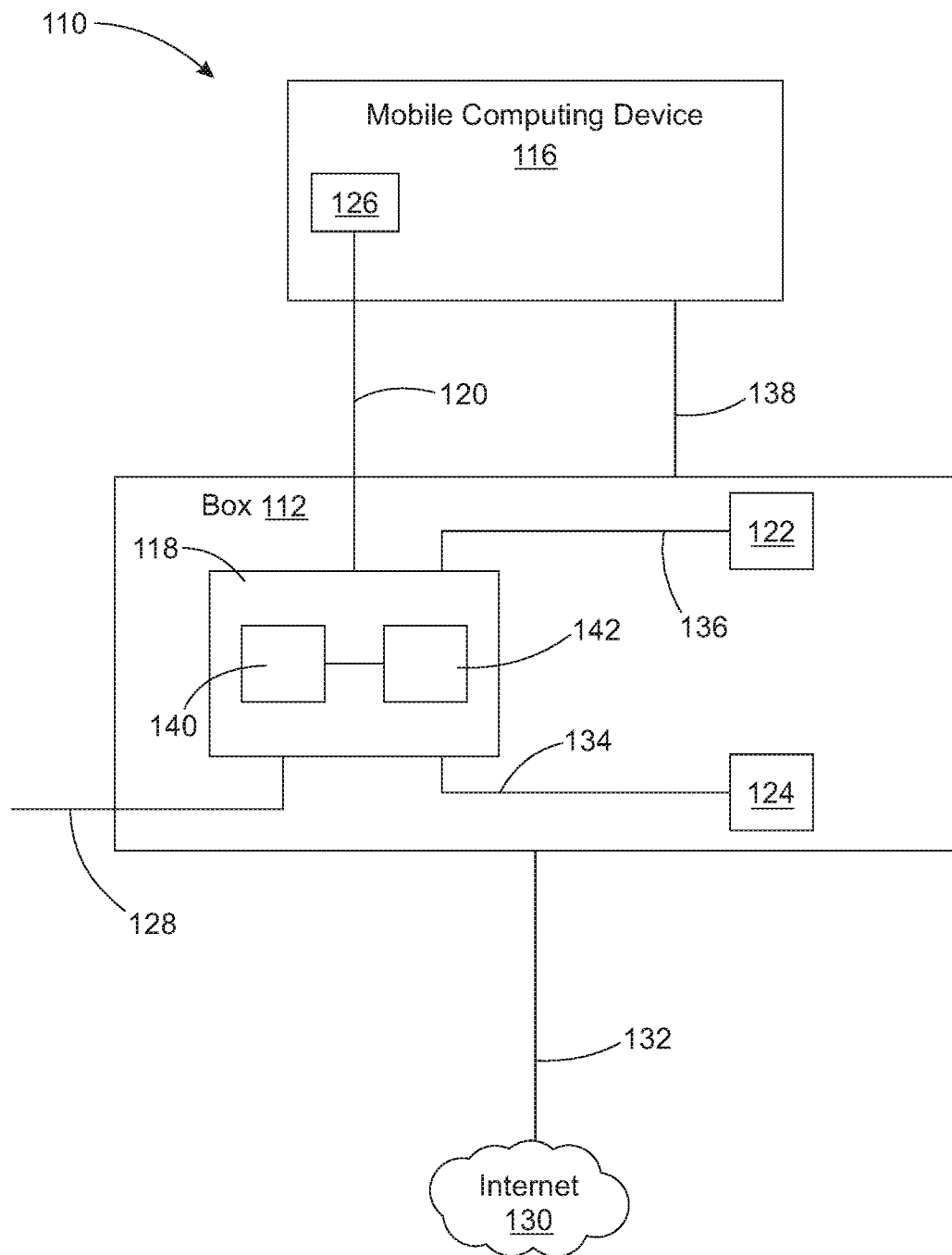
FIG. 2 shows a block diagram of the smartphone lock box system of FIG. 1 according to an embodiment.
Figure 3:
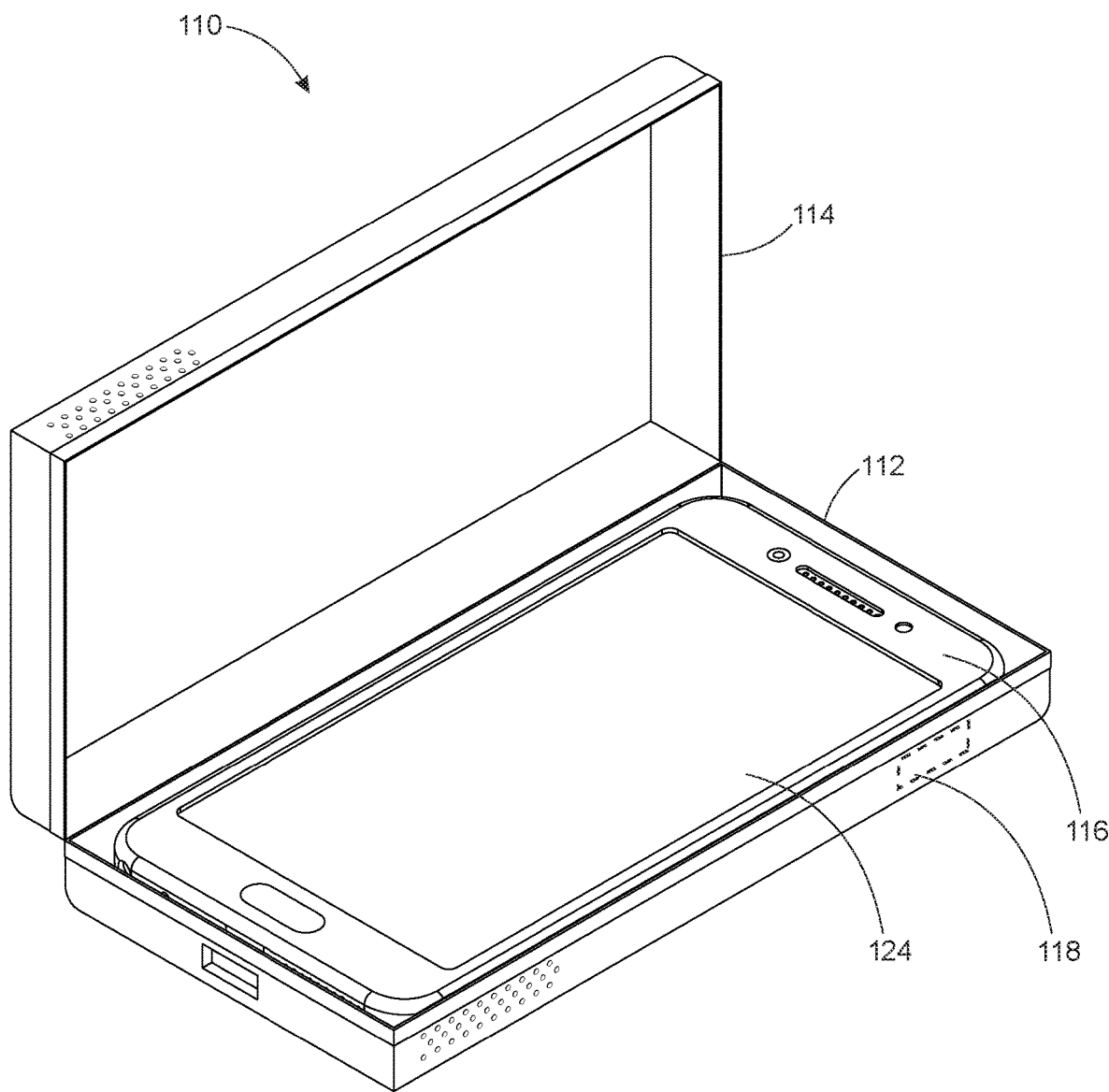
FIG. 3 is a perspective view of a smartphone lock box system with the lid open and holding a mobile computing device according to an embodiment.
Figure 4:
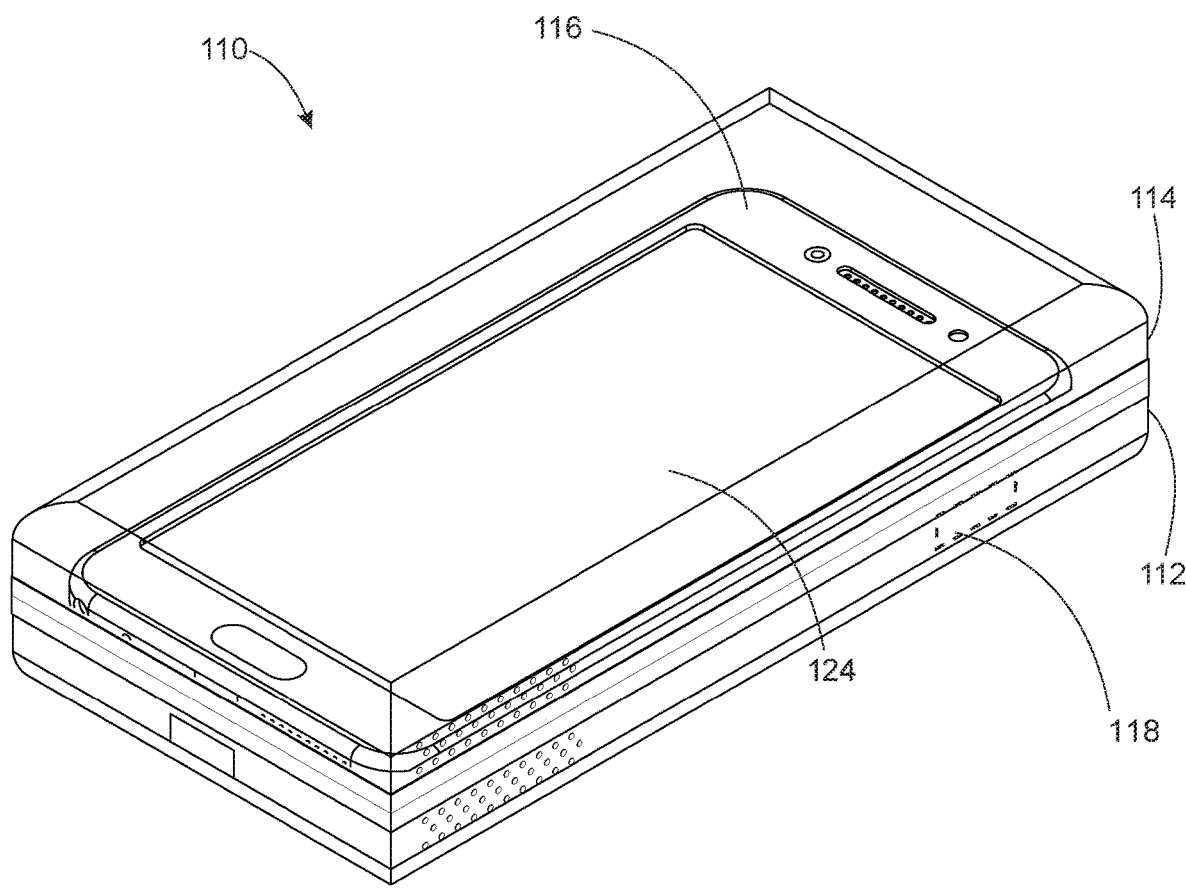
FIG. 4 is a perspective view of a smartphone lock box system according to an embodiment.

In embodiments depicts in FIGS. 1C-1D, the smartphone lock box system 110 may include lock boxes 112 being used in by a business, workplace, team manager, supervisor or employer-employee environment. Additionally, this may operate in at a home or home office allowing an employee access to the system 10 from home when working from home. The use of smartphones in the workplace or when working from home is a drain of the productivity of the workforce. The insertion of a smartphone within a lock box or container 112 may operate as a "clock in" and "clock out" function for the employee. As depicted in FIGS. 1C-1D, the lock box or container 112 may be located at a workstation in an office or a workstation in a home of the employee and may be connected to a computer at the workstation either in the office at the business location or at the home of the employee. The employee or the like may place his or her smartphone or other mobile computing device 116 within the lock box or container 112. The sensing element 118 and the mobile computing device 116 operating the lock box software application engage to determine the mobile computing device 116 is within the container 112. This may be by the mobile computing device 116 sensing the sensing element 118, such as by any type of close-proximity communication link. The mobile computing device 116 within the lock box or container 112 may then communicate with the system 110 through the network connection of the mobile computing device 116. Further, lock box data, including the information of the employee using the lock box or container 112 and the time that the smartphone 116 is within each lock box or container 112 may be reported to a server through the network connection of the mobile computing device 116. In other embodiments, lock box data, including the information of the employee using the lock box or container 112 and the time that the smartphone 116 is within each lock box or container 112 may be reported to a server through the wireless network of the mobile computing device 116 by operation of the lock box application. The server may automatically produce and deliver to a supervisor, or the like, a report that depicts the usage of the smartphone lock boxes by the employees. This lock box data can be utilized to determine effectiveness of employees and the effects of smartphone accessibility on productivity of the employees. This system is operable from the home of the employee as discussed above. This allows the employee to work even in instances where there may be illness, weather or other reasons that would inhibit an employee from being able to travel to the work. Further, this is useful for employees that have flexibility to work from multiple locations or who even travel. The lock box 12 may be portable and can travel with the employee to clock-in regardless of the employee's location.

In some embodiments, the system may require the employee to utilize biometric scans in order to initiate operation of the mobile application before it can operate the clock-in feature or the clock out feature of the application. The biometric scans may be a facial scan, fingerprint scan or the like from biometric recognition software of the mobile computing device 116. Further, the server may be programmed to create and to send one or more verification messages to the mobile computing device 116 requiring a biometric scan to verify the employee is still nearby the mobile computing device while it is in the lock box 12. The one or more verification messages may be sent at random times or intervals. The use of biometric scans may operate as a deterrent to employees from clocking in at home and then leaving or having someone else clock in for them on a different mobile device by simply entering a user name and password on another mobile computing device.

When operating within the work environment, the lock box or container 112, in some instances, may not be utilized as a clocking in feature but may operate to track smartphone usage by the employee when the employee should be working. In these embodiments, the system 110 may determine whether the employee had his or her smartphone 116 within the lock box or container 112 at times when the employee is clocked in and in a status of at work. Further, the system 110 may be configured to account for breaks by the employee, such as 15-minute breaks, lunch breaks and the like during the day, wherein the employee removes his or her smartphone 116 from the lock box or container 112 during the break. This will lead to employees that still have the ability to utilize the phone during breaks and reduce distraction from the smartphone during times when the employee is working. Employers may also have the ability to vary the settings to allow employees to access their phones a certain number of times in a workday, for a certain amount of time in a workday, or a combination of certain number of times and amount of time in a workday. In other words, as previously stated, each employer and work group can establish acceptable limits of access and set the system to only alert or report when over use is recognized. Also, the system 110 can provide a report of cumulative distraction free time worked, start time and end time and frequency of distractions for a certain worker at their station.

The system 110 in a workplace environment, may include a clear lid 114 or a clear lid 114 and clear box or container 112 (as described below with regard to FIGS. 1A-1B), wherein the mobile computing device 116 is visually accessible and/or audibly accessible for alerting an employee of certain types of messages or calls that come through the smartphone 116 that may be an emergency or otherwise urgent. This still allows the employee to avoid distractions without the concern of missing an urgent call from sources, like a child, a child's school, emergency alerts, government alerts, Amber alerts, weather alerts, and the like.

Figure 7A:
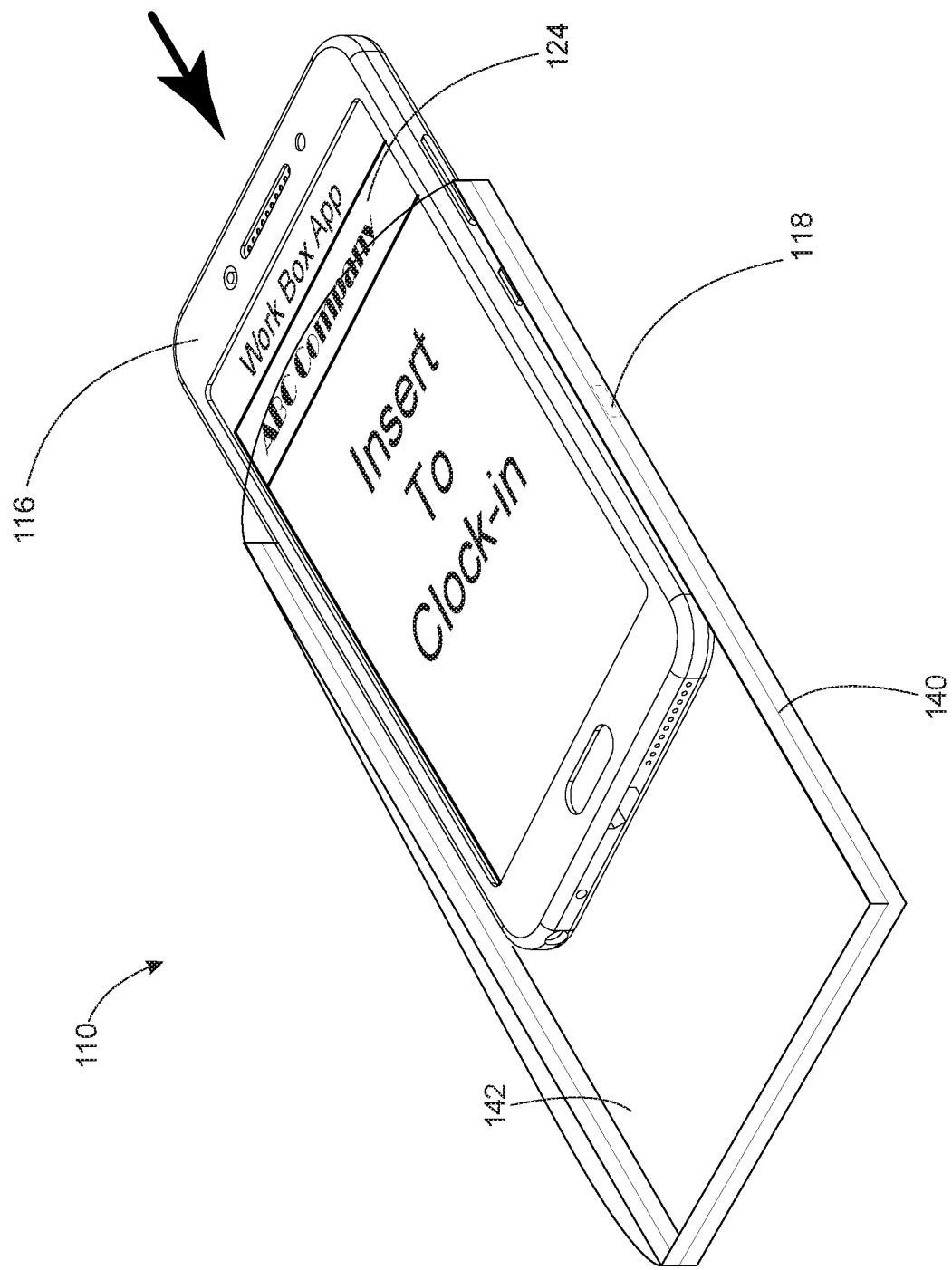
FIG. 7A is a perspective view of a sleeve of a smartphone lock box system in a work environment with a mobile computing device being slid into it according to an embodiment.
Figure 7B:
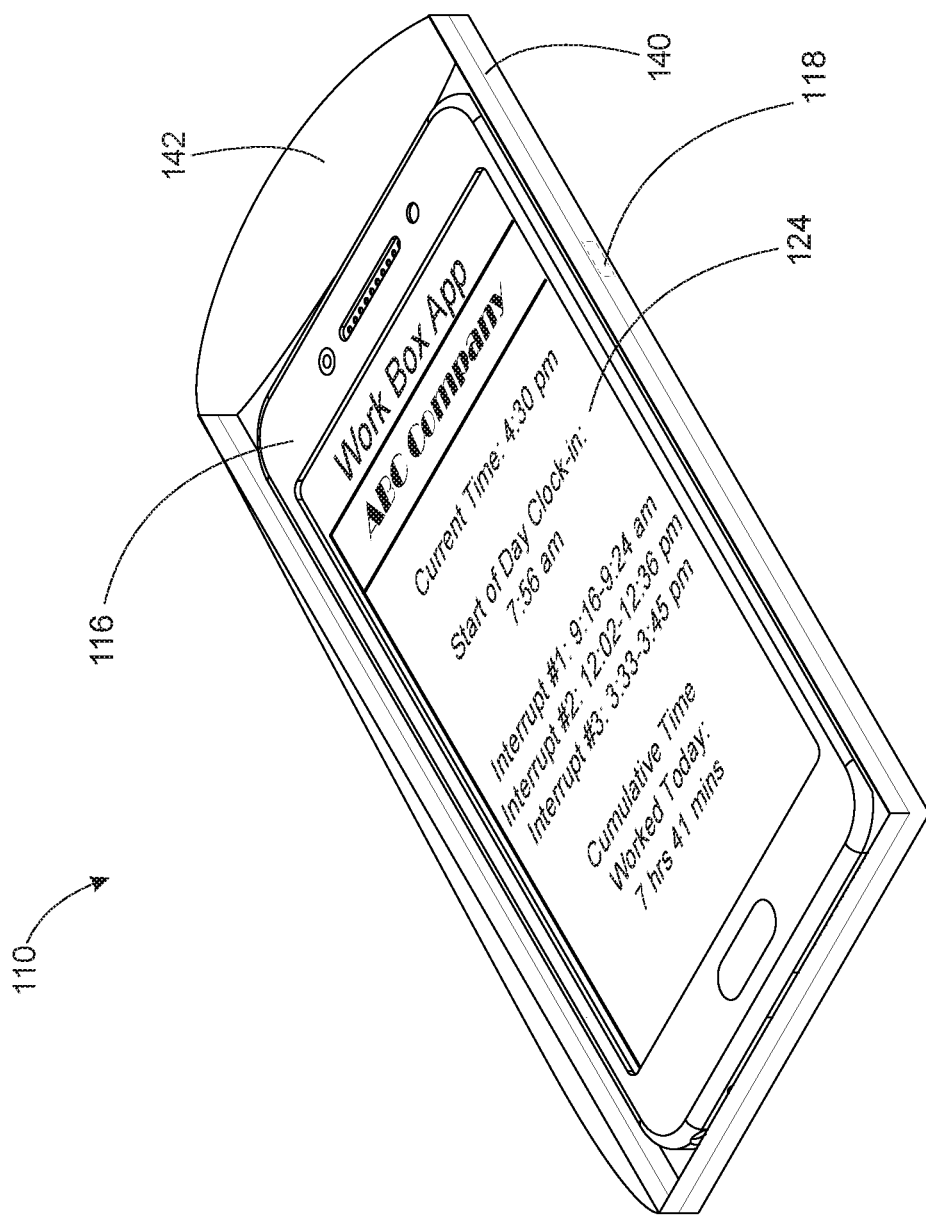
FIG. 7B is a perspective view of a sleeve of a smartphone lock box system in a work environment with a mobile computing device retained within it according to an embodiment.
Figure 7C:
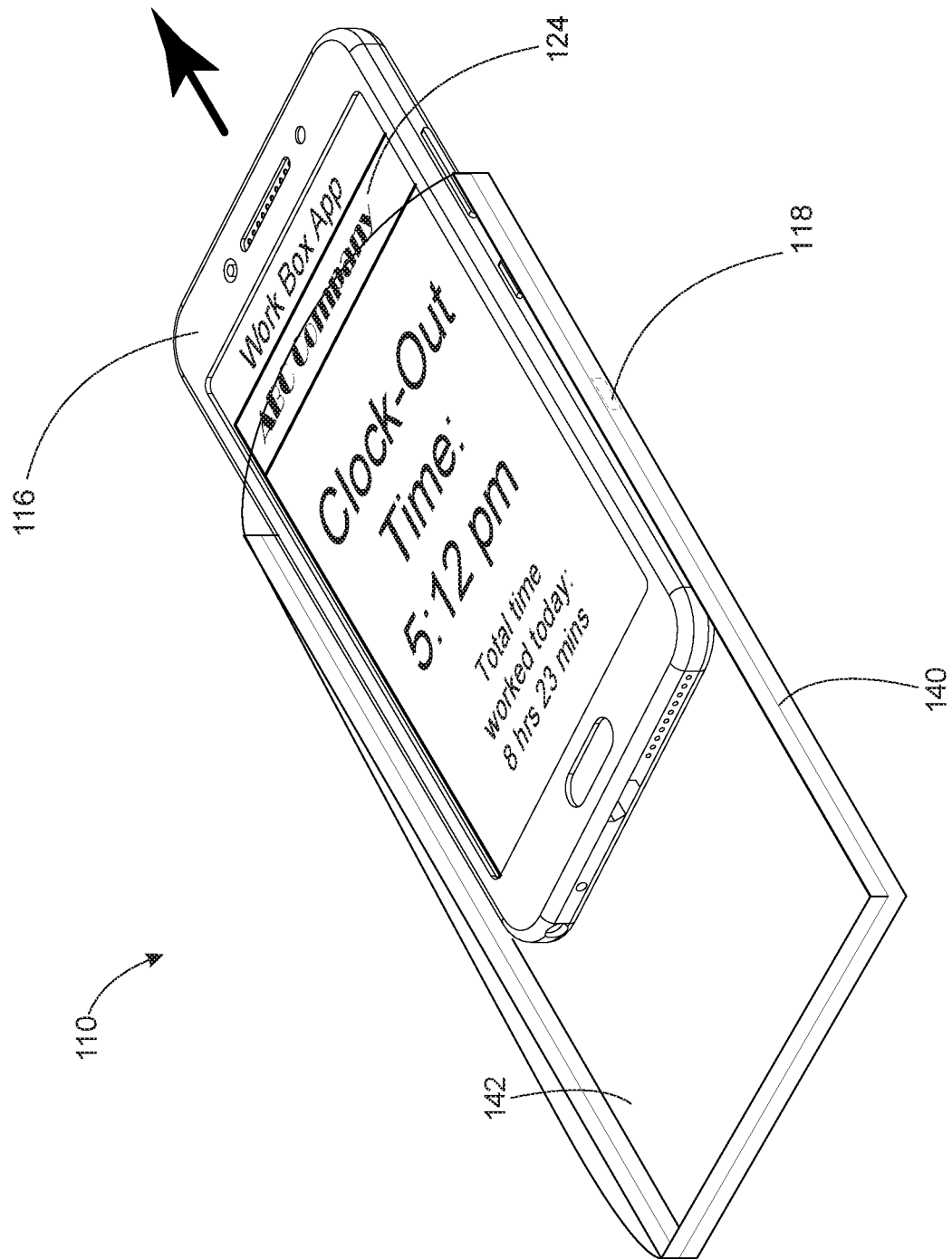
FIG. 7C is a perspective view of a sleeve of a smartphone lock box system in a work environment with a mobile computing device being slid out of it according to an embodiment.

Further still, as shown in FIGS. 7A-7C depicted is a sleeve or pouch 140 functioning as the container 112 used in a workplace environment. In operation, the sleeve 140 may include a front clear portion 142, wherein the mobile computing device 116 is slidable within the sleeve and the clear portion 142 of the sleeve 140 provides visual access to the mobile computing device 116. The sleeve 140 may include a sensing device 118 and operates as previously described above to determine that the mobile computing device 116 is inserted within the sleeve 140. As shown in FIG. 7A, the mobile computing device 116 may operate a work box app (with is the same as the lockbox application 126) that may be customized for a particular company's usage. The work box app may operate by displaying on display 124 an indication that the app is running but not located within the sleeve or pouch 140 and thereby direct the user to slide the mobile computing device 116 into the container 140 in order to clock-in.

As the phone is completely inserted within the sleeve or pouch 140, as shown in FIG. 7B, the mobile computing device 116 running the lock box software application is activated and senses the sensing element 118 and determines that the mobile computing device 116 is within the sleeve or pouch 140 and display 124 reflects this determination and begins displaying information related to the amount of time the mobile computing device is within the sleeve or pouch 140. This information displayed may include current time, clock-in time, time intervals that the mobile computing device was removed from the container, cumulative clocked-in time and the like. For example, FIG. 7B depicts the current time, a start of day clock-in time, interruption times for each instance the phone was removed from the container 140, and cumulative time worked The interruption times may be instances of breaks, pulling a phone out for personal use, a lunch break and/or the like. This information is viewable through the clear portion 142 of the sleeve or pouch 140.

At the end of the work day, as shown in FIG. 7C, the user may slide the mobile computing device 116 from the sleeve and the work box app operating on the mobile computing device may display on display 124 an indication of the clock-out time and the total time worked in that particular day. All of this data may be reported to a server and be retrieved by the employer, supervisor and the like In embodiments shown in FIGS. 1A and 1, lid 114 of box or container 112 may be clear to allow a display 124 of the mobile computing device 112 to be viewed when box or container 112 is closed. Display 124 displays information related to mobile computing device 116 and smartphone lock box system 110. When mobile computing device 116 is locked or secured in box or container 112, display 124 can show the amount of time that mobile computing device 116 has been in box or container 112. Or, display 124 can display the amount of time that mobile computing device 116 still needs to be in box or container 112, for example. Parents can set up reward systems for their children to encourage them to leave their mobile computing device 116 in box or container 112 for a certain amount of time, for example, or during certain times of the day. Display 124 can provide feedback on when mobile computing device 116 should be in box or container 112 and when and how long mobile computing device 116 has been in box or container 112. Display 124 can display information from mobile computing device 116 viewable through the clear lid 114 and/or clear box or container 112. For example, mobile computing device 116 and lock box app 126 can be programmed to send messages from certain individuals or entities to display 124, or other important or emergency information. There may be messages or contacts that have priority status, and this information can be set to be sent to display 124 while mobile computing device 116 is in box or container 112, so that the user can see these priority messages through the clear lid 114 and/or the clear box or container 112.

Smartphone lock box system 110 is used to track and report the times that mobile computing device 116 is locked or secured in box or container 112 and limits access by the owner to the mobile computing device 116 and further reports the frequency of which the phone is removed from the box or container 112. The system 110 operates to limit access, but still gives the ability to access the phone if needed. Children, teens, and adults are often distracted by their smart phones and have difficulty getting tasks done and getting disconnected from technology. Smartphone lock box system 110 helps individuals disconnect from their technology and provides a way to track the amount of disconnect. Box or container 112 uses sensing element 118 that communicated with the mobile computing device 116 operating a mobile application, wherein operation of the mobile application includes a close proximity communication system. As the phone operating the mobile application is placed within the box or container 112, it is located proximate the sensing element 118 and the mobile computing device 116 determines by sensing the sensing element 118 that the mobile computing device 116 is within the box or container 112. The system 110 tracks and reports the times and periods that mobile computing device 116 is in box or container 112. Parents can use smartphone lock box system 110 to monitor and understand their children's use of mobile computing device 116, wherein the parent may utilize his or her external mobile computing device to monitor the status of the smartphone in the box 12. Children and students can earn rewards for having their mobile computing device 116 be in box or container 112 at certain times or for certain lengths of time. Parents can apply more valuable rewards for having mobile computing device 116 be in box or container 112 at certain times. For example, a child may get a larger reward for putting mobile computing device 116 in box or container 112 at designated study times, than for sleeping times. Smartphone lock box system 110 can be used by parents to control how long children use their mobile computing device 116, and make the child choose when they won't be using mobile computing device 116. Smartphone lock box system 110 can be used by parents, teachers, students, employers, or any other individual or group to track and report when and how long one or more mobile computing device 116 is inside box or container 112.

Figure 5:
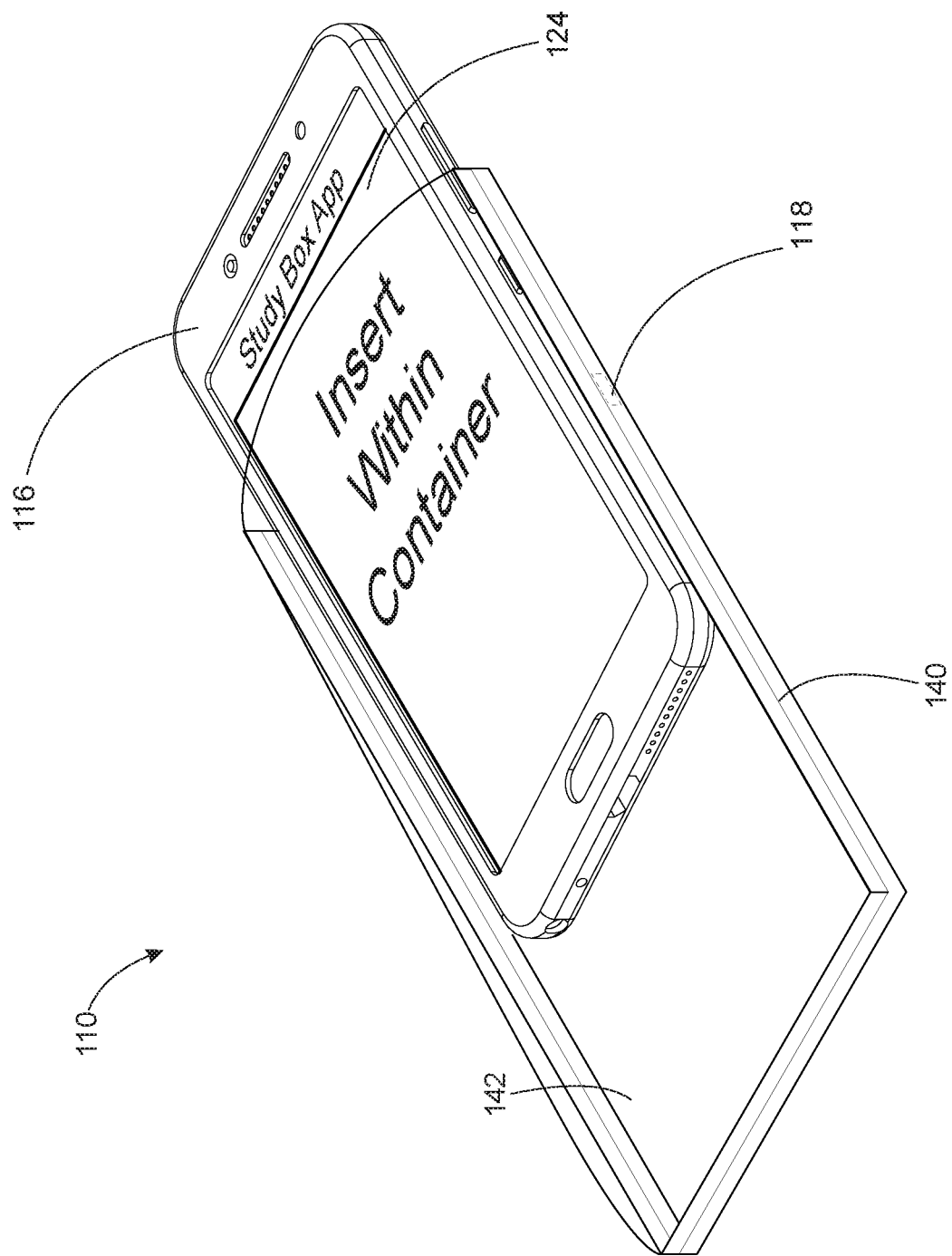
FIG. 5 is a perspective view of a sleeve of a smartphone lock box system with a mobile computing device being slid into it according to an embodiment.
Figure 6:
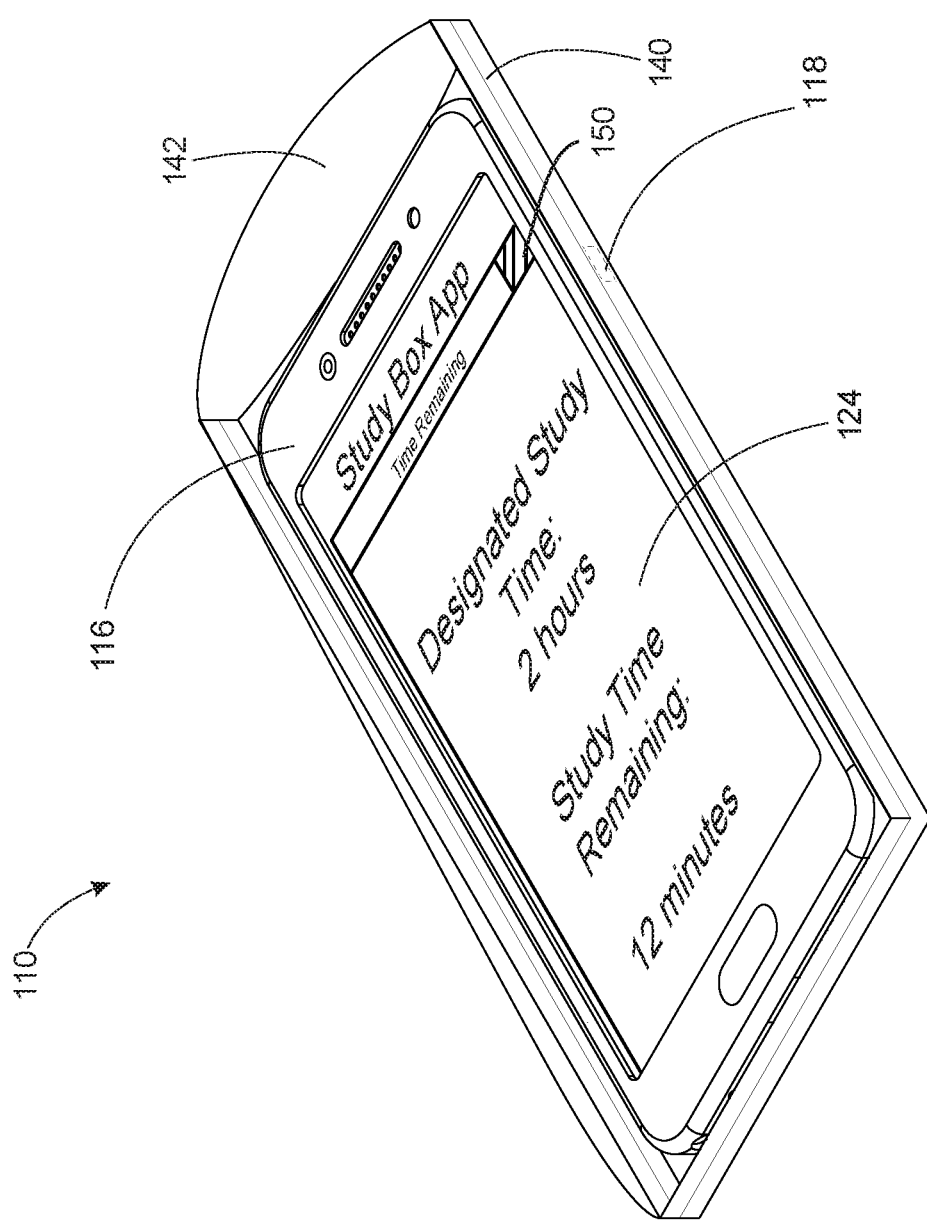
FIG. 6 is a perspective view of a sleeve of a smartphone lock box system with a mobile computing device retained within it according to an embodiment.

Referring to FIGS. 5 and 6, another embodiment includes a sleeve or pouch 140 that operates as the box 112. The sleeve 140 includes a front clear portion 142, wherein the mobile computing device 116 is slidable within the sleeve and the clear portion 142 of the sleeve 140 provides visual access to the mobile computing device 116.

The sleeve 140 may include a sensing device 118 and operates as previously described above to determine that the mobile computing device 116 is inserted within the sleeve 140. As shown in FIG. 5, as the phone is slid into the sleeve 140, the lockbox software application may be running on the mobile computing device 116 and displaying on display 124 an indication that the app is running but not located within the sleeve or pouch 140. As the phone is completely inserted within the sleeve or pouch 140, as shown in FIG. 6, the mobile computing device 116 running the lock box software application is activated and senses the sensing element 118 and determines that the mobile computing device 116 is within the sleeve or pouch 140 and display 124 reflects this determination and begins displaying information 150 related to the amount of time the mobile computing device is or should be within the sleeve or pouch 140. This is viewable through the clear portion 142 of the sleeve or pouch 140. Additionally, the display 124 may display a countdown bar to show the passing of time graphically. It will be understood that other graphical representation of the passage of time the mobile computing device 116 is within the container 140 may be utilized without departing from the scope of the invention.

Additionally, embodiments of the present invention include the mobile computing device 116 running the lock box software application that activates a sensor of the phone to determine that the mobile computing device 116 is within the box 112 or sleeve 140. The sensor of the phone may be a camera, an accelerometer, an audible sensor, a magnetic connection and the like. For example, the camera or light sensor of the camera may operate to determine if the light is dimmed while the app is operating in order to determine it is within a container 112 or use of microphones, touch capabilities and the like to determine that the mobile computing device 116 is within the container 112.

In some embodiments, multiple boxes may be linked together electronically, wherein a study group of students can all have their respective smartphone in a lock box or container 112 and communicate with the other lock boxes 112 to ensure that all members of the study group are providing full attention to the study session or group project being worked on without distraction of a phone. In certain embodiments, special rewards for a group studying in this fashion. Further, in other scenarios, such as incentives from coaches or advisors, tutors, teacher assistants, labs and the like where members of a team or the like have certain study hours agreed to by the team and the teams study hours may be monitored by use of the lock box or container 112.

Embodiments may be utilized in various ways without departing from the scope of the invention. The following include some configurations of the system 110.

Fabric Applications

Figure 8:
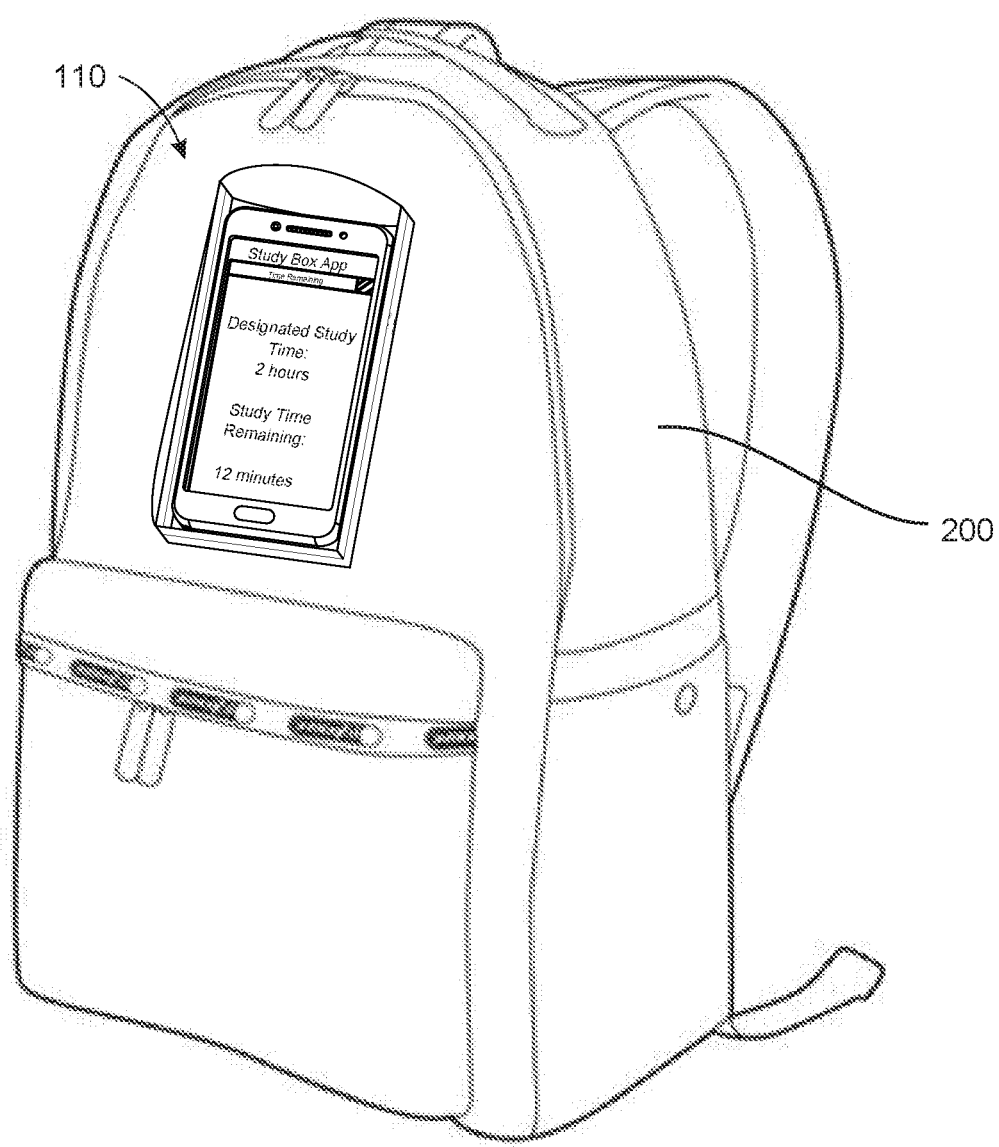
FIG. 8 is a perspective view of a smartphone lock box system coupled to a backpack according to an embodiment.

Embodiments of the smartphone lock box system 110 may be utilized in fabric formed items. For example, FIG. 8 depicts the use with a backpack 200. This allows the smartphone lock box system 110 to be with the student no matter where the student is, such as, but not limited to, school, a library, a home, a dorm room, a coffee shop and the like. Other fabric items not shown may include, without limitation, a purse, a Zuca, luggage and the like. These types of systems can operate as a smartphone lock box in any location that an individual is, such as at school, in a library, in a dorm room and the like.

Furniture Units

Figure 9:
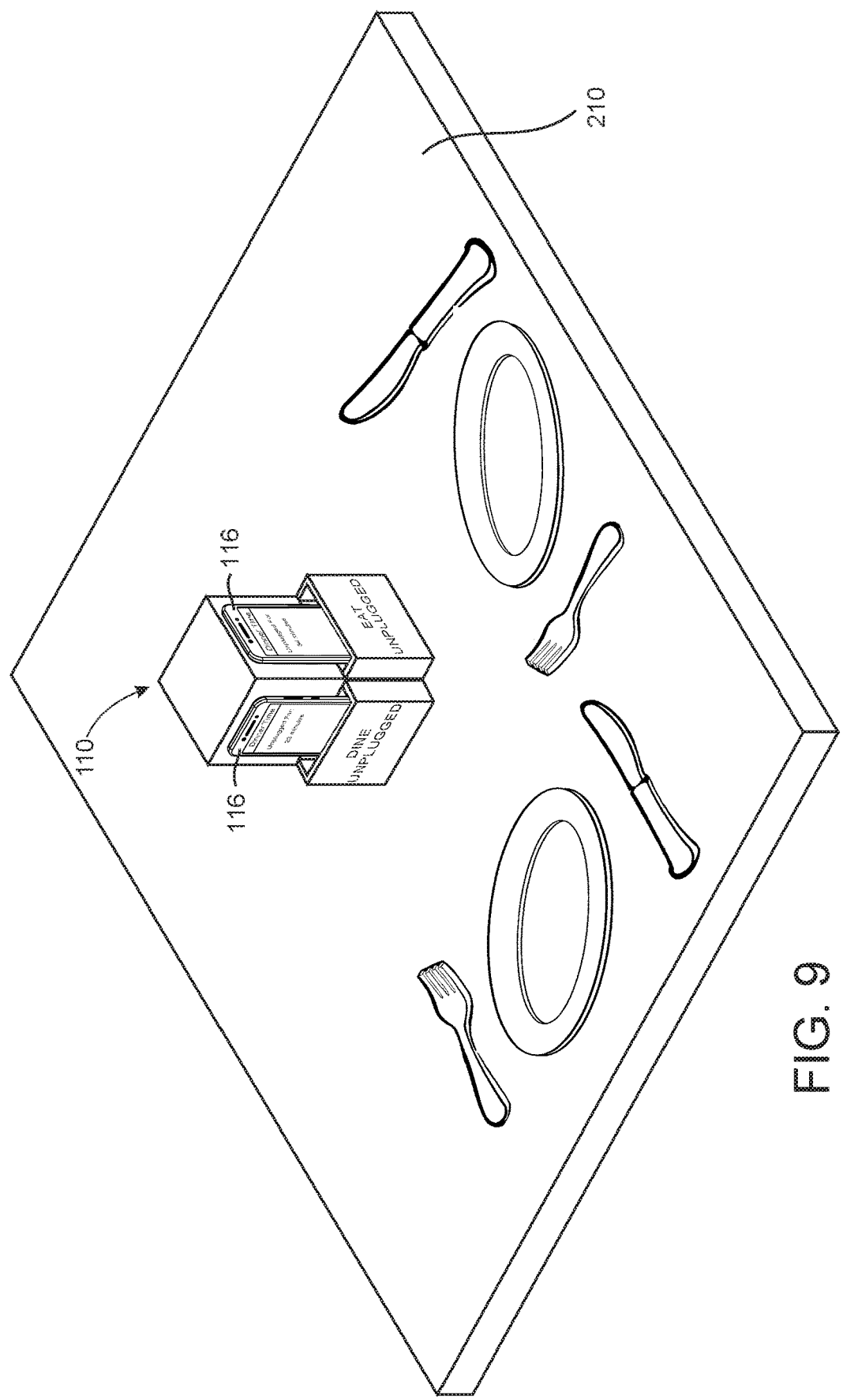
FIG. 9 is a perspective view of a smartphone lock box system coupled to a table according to an embodiment.

Embodiments of the smartphone lock box system 110 may be utilized in furniture items. For example, FIG. 9 depicts the use with a table 210. Other furniture items not shown may include, without limitation, a conference room table, desk, nightstand and the like. The table 210 can be home dining table, a restaurant table, and end table and the like. In dining type tables, the system 110 can operate to create an ecosystem where users are utilizing smartphones less and connecting on a more personal level. The system 110 operates to display to each user the amount of unplugged time that he our she has engaged in while dining. This can be reported to a server for storage and later for reporting.

Vehicle Units

Figure 10:
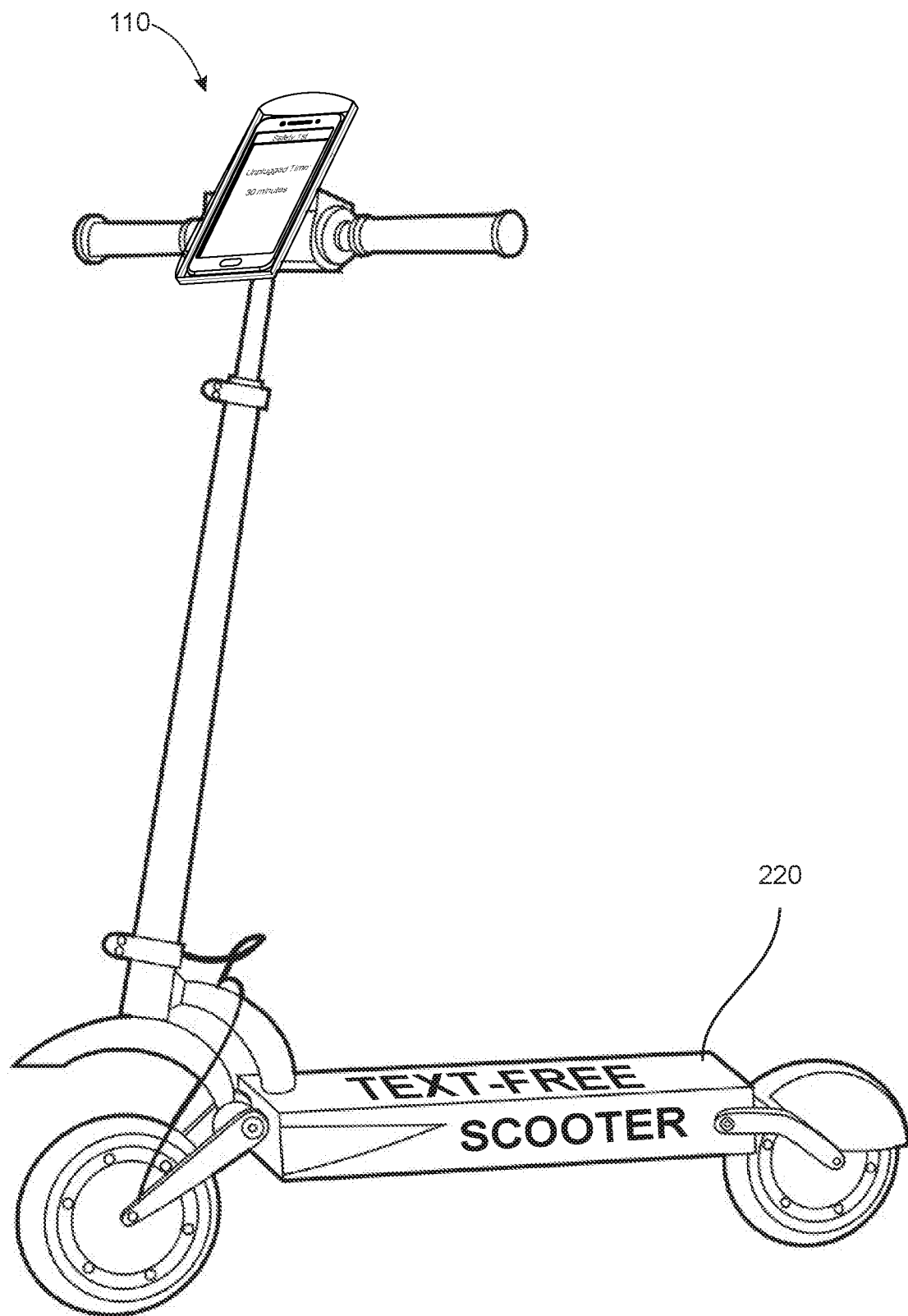
FIG. 10 is a perspective view of a smartphone lock box system coupled to a scooter according to an embodiment.
Figure 11:
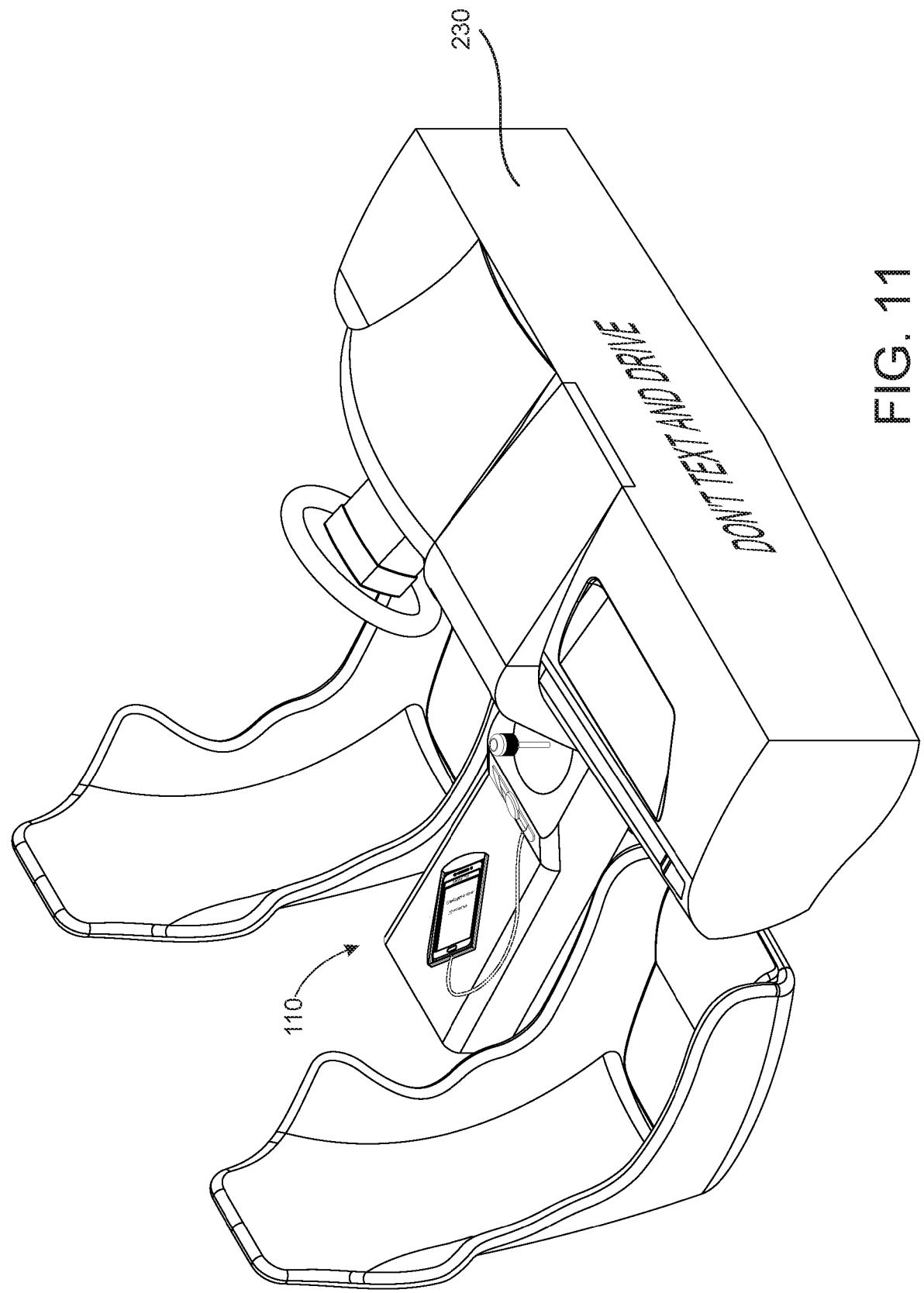
FIG. 11 is a perspective view of a smartphone lock box system coupled to a car according to an embodiment.

Embodiments of the smartphone lock box system 110 may be utilized in vehicles. For example, FIG. 10 depicts the use with an electric scooter 220. This allows for vehicles like a scooter 220, such as a bicycle, motorcycle and the like, to have a hands-free capability during operation of the scooter 220 or other similar vehicle. Other vehicles not shown may include, without limitation, a cockpit for and airplane or helicopter, a bus, a motorcycle, a truck, a boat, a bike, a moped, and the like. It may be used by drivers or by passengers such as in a back seat for a child. As another example, FIG. 11 depicts the system 110 may be used in a vehicle like a car 230. The system 110 may include an adapter to plug into the vehicle in order to charge the mobile computing device 116 within the container 112 or 140. Additionally, in these embodiments, a navigation system may be utilized by mobile computing device in order to provide navigation services to the vehicle driver.

The system 110 for use with vehicles provides safety by reducing distractions, such as, but not limited to, texting while driving that smartphones or other mobile computing devices 116 present for drivers. In some embodiments, the mobile computing device 116 may utilize an accelerometer or GPS device in order to determine the speed of travel of the mobile computing device 116. At a predetermined speed threshold, the mobile computing device 116 automatically initiates the system 110 by operating the lock box application 126. In some embodiments, the lock box application 126 may run in the background in order to initiate operation upon reaching the threshold speed. This disables the functionality of the phone when inserted within the container 112 or 140 to prevent touch access of the phone. The system 110 may include the mobile computing device 116 automatically disengaging the system 110 in response to the speed dropping below the threshold level for a predetermined amount of time. The time the mobile computing device 116 is operating to disable features is sent to a server for storage and reporting.

Additionally, the system 110 in operation with a vehicle may record the time that it is in the container. This can be utilized by insurance companies in order to determine discounts for safe driving, wherein the discounts are tied to the mobile computing device 116 being inserted within the container when a driver is driving. Additionally, the data may be stored and utilized as evidence of the driver not texting or engaging with a phone while driving. In other embodiments, it can be utilized to track mileage.

Appliance Units

Embodiments of the smartphone lock box system 110 may be utilized in appliances such as, but not limited to a refrigerator, a stove, a microwave, and the like.

Miscellaneous Uses

Embodiments of the smartphone lock box system 110 may be utilized in various ways. For example, and without limitation with a plastic bag or accessory that has a bendable display; as a pocket protector unit that can be put in and removed from a pocket of a shirt; as a charging unit for the mobile computing device or external devices such as, without limitation, a sleeve that attaches to laptop and powers phone, a system 110 built into workplace computer or monitor, of phone at call centers, and may be integrated into a battery pack.

Further, it is contemplated that operation of the system 110 may have the ability for a user to control all connected devices. For example, all devices that can talk to each other, like a smartphone, a tablet, a laptop and the like can all be limited in communication ability by the placing of the smartphone within a container of the system 110. Thereby ensuring that the user does not receive communications on any connected device and ensuring removal of distractions.

In additional embodiments, each of the types of lock box containers may be utilized in order to record the amount of time that the smartphone is within any container within a single day. The system 110 may then allow users to set goals for amount of time away from the screen of the mobile computing device 116. It can track all times the mobile computing device 116 is within any container and store the same in a central repository. Multiple users may then compete for most time away from devices, rewards may be earned by reaching certain levels of non-screen time and the like. Permitted group data may also be collected and shared with the user, such as family having all phones in a multiple device container and track and view all dining time away from mobile computing devices in a predetermined amount of time, such as a week.

In this embodiment, the present invention includes a method of using a smartphone lock box system. The method includes coupling a plurality smartphone lock boxes to a server, wherein each smartphone lock box is associated with an individual employee; placing a plurality of smartphones of employees within a plurality of smartphone lock boxes, wherein one smartphone is placed within one smartphone lock box; sensing whether the plurality of smartphones are within the plurality of smartphone lock boxes in response to a sensor in each smartphone lock box sensing the presence of a smartphone, wherein each smartphone lock box communicates to the server the time the smartphone is placed within the smartphone lock box and communicates to the server the time the smartphone is removed from within the smartphone lock box; automatically storing all times communicated from the smartphone lock boxes in a memory of the server; and automatically generating a report of times that each smartphone lock box associated with each individual employee contained a smartphone to determine the time that each individual employee's smartphone is within the smartphone lock box.

Embodiments may be available on or through the internet, such as through domain names reserved and owned by Applicant that include freshmanprotection.com or the like.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A smartphone lock box system for clocking in for work comprising:
    a single mobile computing device of an employee, the single mobile computing device operating a lock box application;
    a container with a clear front portion, wherein the container holds only the single mobile computing device and limits physical tactile engagement with the mobile computing device; and
    a close proximity communication system comprising a passive close proximity sensing element integrated into or coupled to the container and a sensing device of the mobile computing device, wherein the sensing device determines that the mobile computing device is within the container during operation of the lock box application in response to the mobile computing device being placed in close proximity to the passive close proximity sensing element only when within the container, wherein a display screen of the mobile computing device is visible through the clear front portion and displays an indication of clocking in and an accumulation of amounts of time the mobile computing device has been within the container during a designated period of time less the time the mobile computing device is removed until replaced within the container and senses the passive sensing element again during the designated period of time, and wherein the lock box is located at a business office or at a home of the employee.

2. The smartphone lock box system of claim 1, wherein the mobile computing device is communicatively coupled to the internet.

3. The smartphone lock box system of claim 1, wherein the container is a sleeve or a pouch with a front portion that is the clear front portion and an opening sized for receiving a single mobile computing device within the sleeve or pouch, wherein the sleeve or pouch holds the mobile computing device and limits physical tactile engagement to the mobile computing device and the clear front portion provides visual access to the mobile computing device.

4. The smartphone lock box system of claim 1, wherein the container is a box with a lid moveable between an open and a closed position, wherein the box holds only the single mobile computing device and the lid limits physical tactile engagement to the mobile computing device and the lid is the front portion that comprises the clear portion to provide visual access to the mobile computing device when in the lid is in the closed position.

5. The smartphone lock box system of claim 1, wherein the sensing device is a native sensing device of the mobile computing device.

6. The smartphone lock box system of claim 1, wherein the mobile computing device operates a mobile application to initiate the clocking in feature of the system.

7. The smartphone lock box system of claim 6, wherein the mobile application requires a biometric scan prior to initiating operation of the mobile application.

8. The smartphone lock box system of claim 7, wherein the mobile application displays a message viewable through the clear front portion requiring another biometric scan from the employee at time after the mobile computing device has been within the container.

9. The smartphone lock box system of claim 8, wherein the biometric scan comprises one of a facial scan or a fingerprint scan.

* * * * *